(12) United States Patent
Cho

(10) Patent No.: US 8,905,472 B2
(45) Date of Patent: *Dec. 9, 2014

(54) VEHICLE ACCESSORY FOR TRANSPORTING OBJECTS

(76) Inventor: Julie Cho, Los Angeles, CA (US)

( * ) Notice: Subject to any disclaimer, the term of this patent is extended or adjusted under 35 U.S.C. 154(b) by 268 days.

This patent is subject to a terminal disclaimer.

(21) Appl. No.: 13/490,375

(22) Filed: Jun. 6, 2012

(65) Prior Publication Data

US 2013/0300161 A1    Nov. 14, 2013

Related U.S. Application Data

(63) Continuation-in-part of application No. 13/469,015, filed on May 10, 2012.

(51) Int. Cl.
*A47C 7/62* (2006.01)

(52) U.S. Cl.
USPC ..................... 297/188.2; 297/219.1

(58) Field of Classification Search
USPC ................. 297/188.08, 188.09, 188.1, 188.2, 297/188.06, 225, 228.12, 228.13, 228.1, 297/229, 255, 452.56
See application file for complete search history.

(56) References Cited

U.S. PATENT DOCUMENTS

| | | | | |
|---|---|---|---|---|
| 1,959,974 A * | 5/1934 | Westgate | ............................. | 5/94 |
| 2,601,488 A * | 6/1952 | Allen | .................................. | 5/94 |
| 2,819,776 A * | 1/1958 | Balsam | ............................. | 190/1 |
| 3,763,972 A * | 10/1973 | Karzmar | ............................ | 190/8 |
| 4,597,605 A * | 7/1986 | Gilbert | ........................ | 297/228.1 |
| 4,863,003 A * | 9/1989 | Carter | ................................ | 190/8 |
| 4,924,814 A * | 5/1990 | Beaudet | ........................ | 119/712 |
| 4,943,105 A * | 7/1990 | Kacar et al. | ................. | 296/24.31 |
| 5,028,086 A * | 7/1991 | Smith | .............................. | 296/69 |
| 5,188,421 A * | 2/1993 | Arseneault | ..................... | 297/182 |
| 5,205,610 A * | 4/1993 | Reninger | ....................... | 297/380 |
| 5,474,329 A * | 12/1995 | Wade et al. | ................... | 280/749 |
| 5,529,341 A * | 6/1996 | Hartigan | ....................... | 280/749 |
| 5,908,218 A | 6/1999 | Martin | | |
| 5,967,602 A | 10/1999 | Ptak et al. | | |
| 6,079,773 A * | 6/2000 | Hassan | ..................... | 297/188.13 |
| 6,182,931 B1 * | 2/2001 | Richard | ......................... | 248/102 |
| 6,327,726 B1 * | 12/2001 | Weber | ................................. | 5/655 |
| 6,652,026 B2 * | 11/2003 | Toyota et al. | .................. | 297/229 |
| 7,261,375 B2 * | 8/2007 | Godshaw et al. | ......... | 297/228.12 |
| 7,287,813 B2 * | 10/2007 | Aliev | ........................... | 297/219.1 |
| 7,309,102 B1 * | 12/2007 | Davis | ........................ | 297/188.06 |
| 7,350,681 B2 * | 4/2008 | Polburn et al. | ................ | 224/275 |
| 7,530,635 B2 * | 5/2009 | Schramek-Flye | ............. | 297/255 |
| 7,537,279 B2 | 5/2009 | Pudney | | |
| 7,677,662 B2 * | 3/2010 | Thompson | ..................... | 297/223 |
| 7,681,292 B2 * | 3/2010 | McConnell et al. | ........... | 29/91.1 |
| 7,780,229 B2 | 8/2010 | Verhee | | |
| 8,151,389 B1 * | 4/2012 | Lando | .............................. | 5/655 |
| 8,408,642 B1 * | 4/2013 | Reidy | ....................... | 297/188.01 |
| 8,454,085 B1 * | 6/2013 | Hsu | ................................. | 297/182 |
| 2003/0097713 A1* | 5/2003 | Kinchen et al. | .................... | 5/652 |
| 2007/0273183 A1 | 11/2007 | Davis | | |
| 2013/0300160 A1* | 11/2013 | Cho | ........................... | 297/188.01 |
| 2013/0300161 A1* | 11/2013 | Cho | ............................. | 297/188.2 |

* cited by examiner

*Primary Examiner* — David R Dunn
*Assistant Examiner* — Timothy J Brindley
(74) *Attorney, Agent, or Firm* — Morrison & Foerster LLP

(57) ABSTRACT

An accessory that attaches to a bucket seat in a vehicle that prevents objects placed on said bucket seat from slipping off of the seat surface is disclosed.

2 Claims, 9 Drawing Sheets

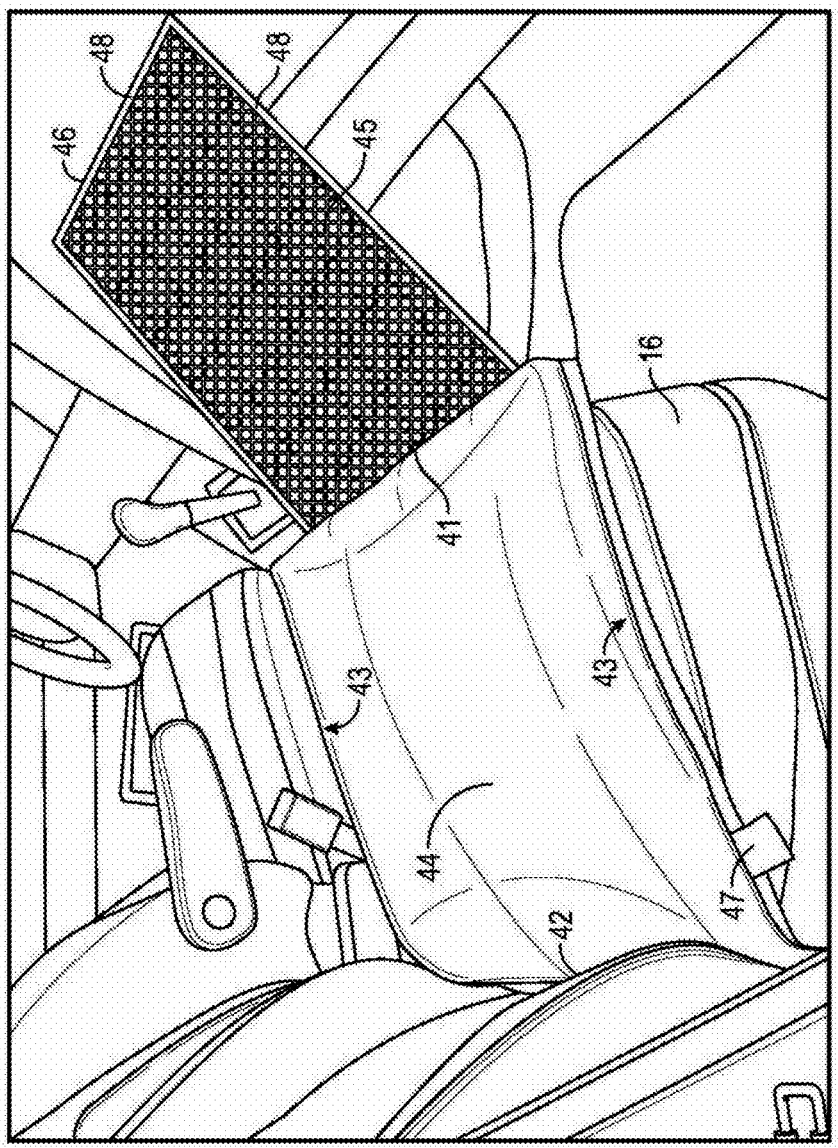

VEHICLE ACCESSORY FOR TRANSPORTING OBJECTS

CROSS-REFERENCE TO RELATED APPLICATION

This application is a continuation-in-part of U.S. Ser. No. 13/469,015 filed 10 May 2012. The contents of this document are incorporated herein by reference.

TECHNICAL FIELD

The invention relates to accessories useful in vehicles for transporting objects on the surface of bucket seats. In particular, the invention relates to accessories that provide angular barriers between passenger seat and the dashboard to prevent slippage of items placed on the seat.

BACKGROUND ART

A common source of annoyance for drivers of vehicles transporting items, such as groceries or dry cleaning on the passenger seat next to them is the tendency of such items to slip off of the seat onto the floor when the car is in motion. It is common for drivers to place objects on the passenger seat for convenience and ready access, and placing storage systems such as containers or organizers on the passenger seat is not satisfactory since these must be removed in order to accommodate passengers and then placed back on the seat when it is no longer occupied.

In addition, there are safety concerns when drivers are distracted by objects falling from the seat or by trying to prevent objects from slipping off. Another hazard is created by objects moving around and becoming wedged in unsafe places. The problems are especially acute when small pets are transported in cages on the passenger seat and could be injured by the cage falling onto the floor and possibly flipping over.

A number of attempts have been made to remedy these problems.

For example, U.S. Pat. No. 5,967,602 describes a slidable tray that is positioned under the surface of the passenger seat on which objects can be stored and which has a vertical barrier to prevent their moving forward onto the floor. The tray slides back into the seat when not in use.

U.S. Pat. No. 6,079,773 proposes a module that folds into the seat back when not in use and when lowered forms a three sided tray with a try bottom situated on the seat portion to accommodate the objects to be transported.

U.S. Pat. No. 7,537,279 discloses a foldable net that attaches to the front of the seat and can be raised to a vertical position or, alternatively, can be attached to the seat's sides.

U.S. Pat. No. 7,780,229 discloses a drawer that can be pulled from the front edge of the seat and folds back flush with the seat when not in use.

U.S. patent application 2007/0273183 proposes a net that pulls up over the seat to provide resistance to movement.

U.S. Pat. No. 5,908,218 provides a pull-up member from under the seat to provide a semi-vertical barrier.

None of the suggestions/solutions is completely satisfactory. The present invention provides an accessory that can be temporarily or permanently attached to the passenger bucket seat of a vehicle and in one embodiment can easily be moved from a closed unobtrusive position flush with the bucket seat to an open position that provides a barrier to prevent slippage and also provides a barrier to obscure the presence of objects on the floor in front of the bucket seat.

DISCLOSURE OF THE INVENTION

The accessories of the invention provide a barrier attached to the front seating edge of a bucket seat on the passenger side of a vehicle that can be secured at an angled position to the dashboard of the vehicle so as to provide a barrier that extends from the front edge of the seat to a position on the dashboard thus preventing any objects stored on the seating surface of the seat from slipping onto the floor. The accessory can be a simple net secured to the front of the passenger seat and to the dashboard, or can be a solid panel or semi-solid fabric extending from the front portion of the passenger seat to the dashboard or may be a bilayered device that can be opened and closed.

In one embodiment, the accessory of the invention is secured to the sitting area of the car seat so that when closed, a passenger can occupy the seat in essentially the same manner as if the accessory were not present. In the closed position, the accessory merely provides extra layers of cushioning on which the passenger may sit. In this embodiment, the accessory is secured to the seat typically by having vertical extensions that hug the vertical portions of the seating area and/or belts that secure the accessory by extending under the seat itself. When opened, a panel is provided against the dashboard to prevent slippage of any objects that are placed in the open accessory onto the floor.

In this embodiment, the object itself is a bilayer of essentially planar fabric components having front, back and side edges wherein the front edge, when in place and in the closed position will face the dashboard of the vehicle the back edge will conform to the back of the horizontal seating area and the sides will essentially frame the sides of the seating area. The sides of the bilayer are fastened to each other in a reversible manner so that the layers can be opened or closed. In order to achieve this, the front edge of the bilayer hinges the two layers, permitting rotation when the fasteners are released so that what will be the top layer when the accessory is installed can rotate open to rest against and be secured to the dashboard of the vehicle. The accessory is also provided with stabilizing elements to secure the open position.

Alternatively, the accessory may have a single layer of fabric or other sheeting material able to attach to the front of the seating area of the passenger seat in a rotating manner so that when open it rests against the dashboard and is secured in the open position and when closed may be arranged, if desired, to conform to the seat itself. This alternative has the advantage that it need not, however, provide a comfortable seating area when closed, as it may be removably installed to permit use only when no passenger is present.

In general then, in a first embodiment the accessory contains a first member that can be secured to the seating area of the bucket seat and essentially conforms to the contours thereof and a second member rotatingly attached at the front edge of the first member (that faces the dashboard) so that when the accessory is in the closed position the second member provides a comfortable seating surface for a passenger, but when in the open position the second member rests securely against the dashboard to provide an "open book" arrangement in which objects can be placed.

In an alternative embodiment, an optionally removable design requires only the equivalent of the second member and an element that permits rotation of a planar sheet representing said second member-equivalent from a position flush with the seating area to a position secured against the dashboard. In this embodiment, there may also be an additional sheet corresponding to the first member in the first embodiment providing a surface on the seating area that may serve as a shield for the upholstery on the seat.

In still another embodiment, the accessory of the invention comprises a net secured to the front edge or panel of the passenger seat that essentially conforms to the front panel of the seat when closed, but when open is extended to form an angled barrier reversibly, but securely coupled to the dashboard.

In still another embodiment, the apparatus of the invention is comprised of a sturdy but flexible frame, typically of metal, that surrounds an interior composed of fabric or mesh designed to lie horizontal on the seat as well as provide a barrier at an angle to the dashboard. This embodiment is easily removable and can be compressed in the closed position by spiraling the framework into a collapsed form of the apparatus.

BRIEF DESCRIPTION OF THE DRAWINGS

FIG. 7 shows still another embodiment of the accessory comprising a cushion containing a retractable panel that can be extended and fastened at an angle to the dashboard.

MODES OF CARRYING OUT THE INVENTION

The basic feature of the present invention is provision of a barrier attached to the front seating edge of a bucket seat that can be secured at an angled position to the dashboard of the vehicle so that a barrier is provided that extends from the front edge of the seat to a position on the dashboard, thus preventing any objects stored on the seating surface of the seat from slipping onto the floor of the vehicle, and further, in some embodiments, obscuring the view of any objects already on the floor in front of the seat. The accessory may be designed to be installed so as to remain in position even if a passenger is to occupy the passenger seat, in which case it may be an assembly of two essentially planar members that when closed and installed provide a comfortable seat for the passenger, and when opened provide a barrier that prevents objects from slipping to the floor.

In another alternative which accommodates the passenger when the accessory of the invention is installed is the provision of a net conforming to the front panel of the passenger seat when in the closed position, but extending to the dashboard to form the required barrier when in the open position.

As used herein, the "front panel" or "front edge" of the passenger seat refers generally to the vertical front panel that extends downward from the seat itself and/or to the edge of the seat portions shared with said panel. In general, "front edge" and "front panel" of the passenger seat are used interchangeably except when it is apparent that only one is intended. (Similar terminology is used for side edges and side panels and back edge and back panel.)

In another embodiment, which is easily removable and reinstalled, the accessory may have only a single planar member which can attach to the front edge or panel of the passenger seat at one edge of the planar member and to the dashboard at the other edge of the planar member and secured by a securing element. The planar member may also be laid flat against the seat by rotating at the edge that conforms to the front edge of the passenger seat.

Figure 1:
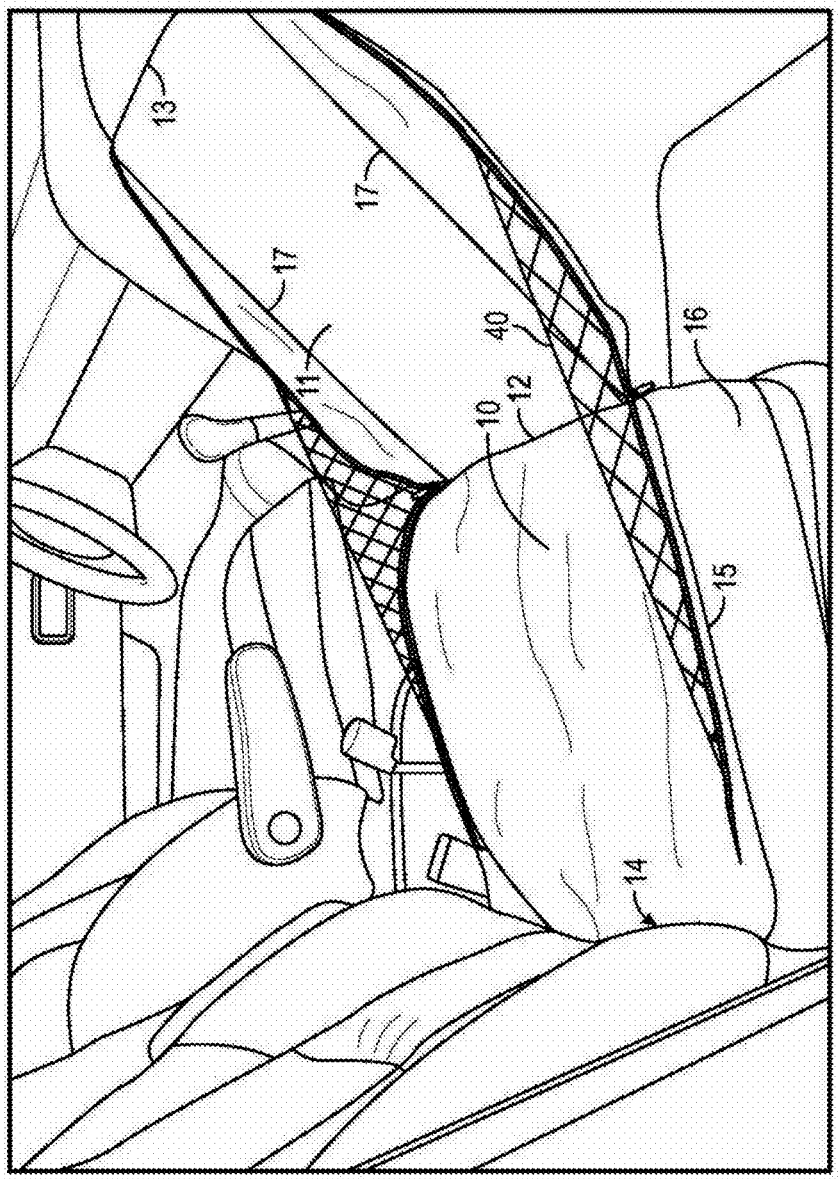
FIG. 1 shows an accessory of the invention installed in the vehicle and in the open position and containing optional netting for further security.
Figure 2:
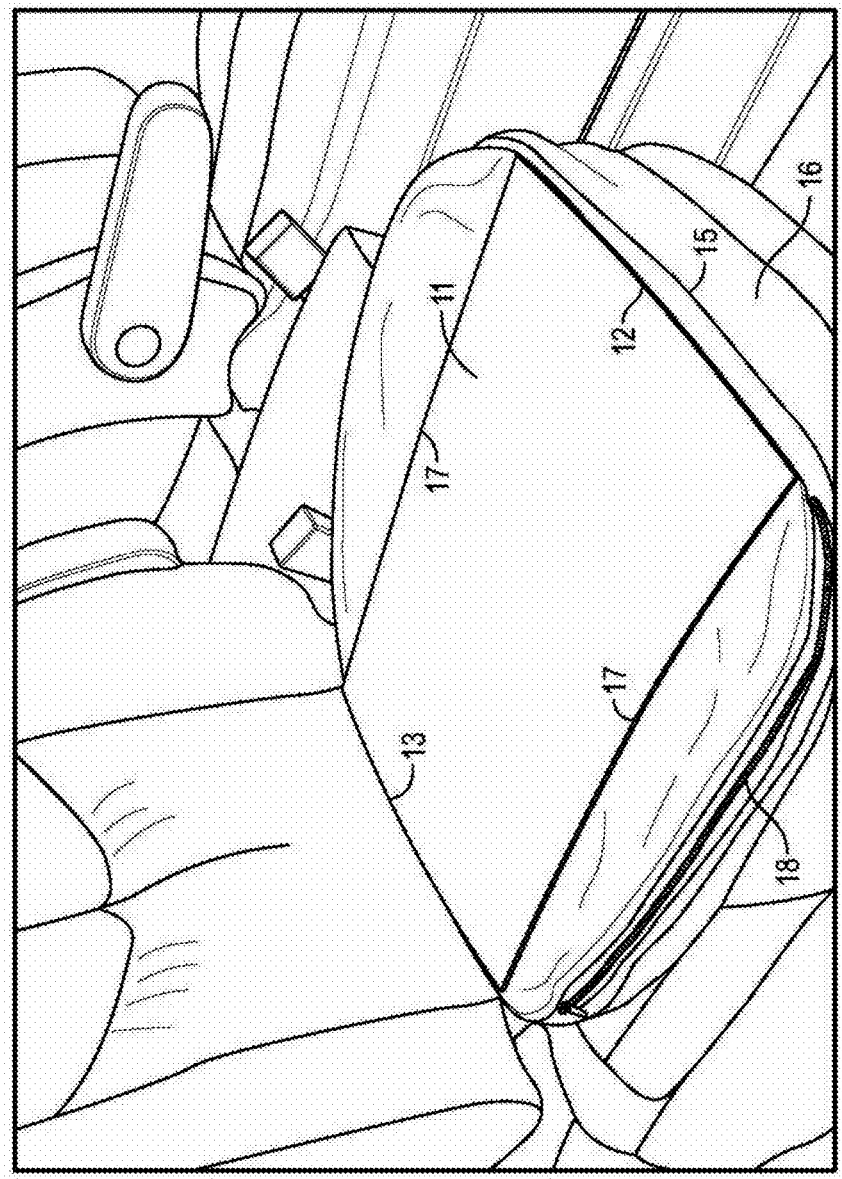
FIG. 2 shows the accessory of FIG. 1 also installed in the vehicle, in the closed position.

One illustrative embodiment of the invention is shown in FIGS. 1 and 2.

FIG. 1 shows this embodiment in the open position. As shown, a first member, 10, is a sheet typically of fabric, netting, or other flexible sheeting that substantially conforms to the contours of the seating portion of the seat. The second member 11 is also comprised of a flexible planar fabric. The first member 10 and the second member 11 are coupled at the front edge of the passenger seat 12 in a rotating coupling such as a hinge or springed or friction hinge and when in the open position as in FIG. 1, the back edge of the second member shown as 13 in the figure is secured to the dashboard. The back edge 14 of the first member aligns to the rear of the seat, and is secured to the seat by, for example, straps (not shown) that extend down behind the crevice between the seat back and seat portion and/or by vertical extensions (not shown) of the first member that are fastened to the downward-extending panels in the back of the seat itself. Member 10 may also include vertical extensions 16 that extend downward from the edges tracking 15 the side and front panels of the seat and surrounding these vertical panels of the seat that extend downward from the seating area. The combinations of these vertical extensions 16 and the elements that secure the back edge 14 to the underlying seat provide essentially permanent installation of the accessory if desired.

The second member 11 also contains rigid supports 17 which can be constructed of any suitable metal, plastic or synthetic. The exact positions of these supports is somewhat arbitrary, and the rigid supports can be moved closer together or farther apart; however, if the accessory is to be permanently installed so that in the closed position it can accommodate a passenger, it is desirable to space them to accommodate comfortably the passenger. The edge shown as 13 may also be strengthened using a rigid element.

FIG. 1 also shows an optional feature 40, shown as netting that provides an additional barrier to movement of objects set on the surface of 10.

FIG. 2 shows the same embodiment as FIG. 1 in the closed position. The second member 11 is now flush with the seating area and should be sufficiently flexible to provide comfort to a passenger occupying the seat. The rigid elements 17 and those optionally occupying the edge 13 are also indicated. The rotating coupling at 12 occupies essentially the front edge of the seating area. The vertical securing portions of the first member 16 are also shown. The accessory is held in the closed position by a fastener, which in this case is a zipper 18.

In this embodiment, the first and second members are composed of flexible fabric in order to provide the flexibility of permitting a passenger to occupy the seat when the accessory is in the closed position. The fabric may be any suitable cloth or plastic and the choice of fabric is constrained only by the requirement to achieve sufficient comfort and sufficient retaining properties in the case of the second member. The fabric that comprises the first and second member need not be the same and indeed neither member need be composed entirely of the same fabric. Combinations, multiple layers and patterns of interlacing fabrics could also be used. Typically, vinyl or leather is used in vehicles, but there is no reason that the fabric could not include nylon, polyester, linen, or a sufficiently dense netting. The specific choice of fabric is ancillary to the invention itself.

Similarly, the fastener that secures the members in the closed position need not be a zipper but could also be snaps, buttons, Velcro™, hooks and receivers, magnets or any alternative means compatible with the design of the accessory. In many cases, "complementary fasteners" are referred to and are of a considerable variety, such as the fasteners mentioned above.

The elements that secure the member 11 to the dashboard when in the open position are also varied. For example, the rotating coupling 12 may be a spring-loaded or friction hinge that is sufficient to provide pressure to maintain the accessory in the open position. Alternatively, an element such as Velcro™ or a complementary fastener or suction cup, can be attached roughly at the top of the face of 11 facing the dashboard to secure to a complementary element placed and secured to the dashboard. In another alternative, the member 11 may be supplied with a strap or cord extending from a position proximal to 13 to the vertical front panel of the seat and secured at each end when the accessory is open. Alternatively, a cord attached to the second member at a suitable position and provided with a loop, bar, or other suitable stopper can be attached to a corresponding receptor on the dash, or may be inserted into the glove compartment so that when the glove compartment is closed, the stopper secures the second member in the open position. Alternatively, the cord attached to the second member for attachment inside the glove compartment can itself be a loop that can be enclosed in the glove compartment. The cord is made of moderately stretchable material to permit this use.

The invention also includes variations of the illustrative embodiments shown in FIGS. 1 and 2. For example, as noted in FIG. 1, optional netting or other barriers that fold into the accessory when it is in the closed position could also be included. In addition, a flat, rigid reinforcing plate that extends through the center of 10 from the edge 14 to edge coupling 12 and/or along the second member from the edge at 12 to the edge at 13 may be included to provide greater rigidity. This extension may be sufficiently narrow so as not to interfere with the comfort of any passenger when the accessory is in the closed position and a passenger occupies the seat.

The rigid barriers 17 in the second member may be placed in any position that provides comfort for the passenger when the accessory is closed.

In an alternative embodiment, the accessory comprises as a planar member only the equivalent of the second member which will lie flat on the passenger seat when installed and in the closed position, but when opened will form an angle between the seat portion of the passenger seat and the dashboard. In this embodiment, the accessory is fastened to the front panel and/or secured to the side panels of the seat. The portion of the securing element that parallels the front edge of the seat is coupled to the second member-equivalent by means of a rotating coupling. As in the first embodiment, the planar member, substantially equivalent to the second member of the first embodiment can thus be rotated into an open position to be secured to the dashboard. The planar member may be composed of fabric and flexible, or may be relatively rigid if the accessory can be removably installed. Such removable installation can readily be accomplished by fitting elements of the accessory around the front and side panels of the seat and providing the rotating coupling at the front edge of the passenger seat. The planar member, when in the closed position may then simply protect the upholstery of the seat, and need not conform to the seat contours so as to accommodate a passenger. It may be completely planar or contain slight curvature so that when opened an additional barrier is formed. As in the case of the first embodiment, the accessory may also provide netting at either side that folds into the accessory when closed but forms an additional barrier when opened similar to that shown in FIG. 1 for the first embodiment.

This further design provides secure attachment to the dashboard in a similar manner as the first embodiment by attaching the planar member to the front panel of the seat by a frictional coupling that prevents re-closure, by a loop that can couple to the dashboard or to the glove compartment or by any other suitable fastening elements, as outlined above.

In still another embodiment, the invention accessory comprises netting which can be installed to surround the front and/or side panels of the seat when in the closed position, but can be extended to an angle with the dashboard when opened, and secured by means of cords or other suitable devices. The netting can be secured to the seat through portions that extend behind the seat back. One illustration of this embodiment is show in FIGS. 3 and 4.

Figure 3:
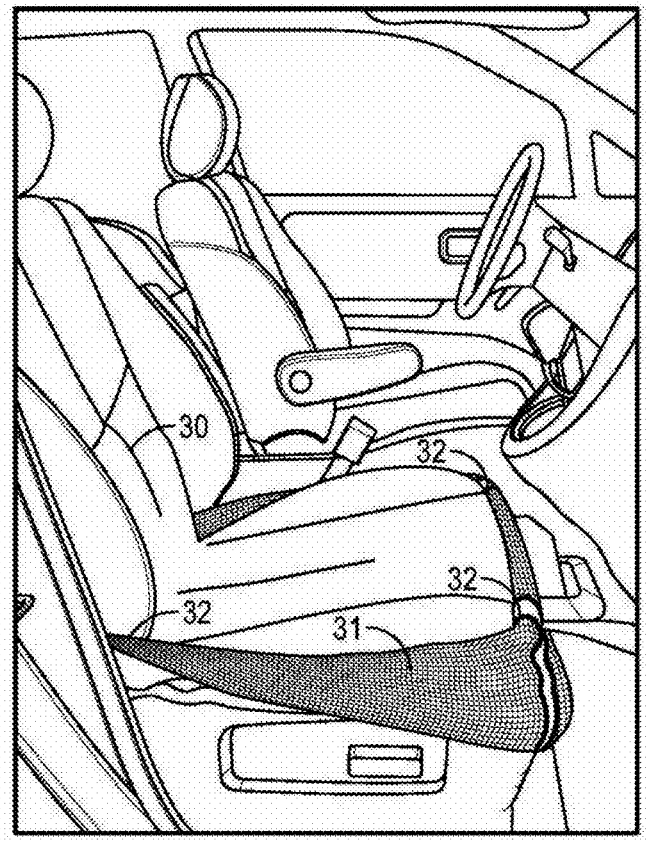
FIG. 3 shows an alternative embodiment installed in the vehicle which comprises a net secured to the front panel of the passenger seat, in a "closed" position.
Figure 4:
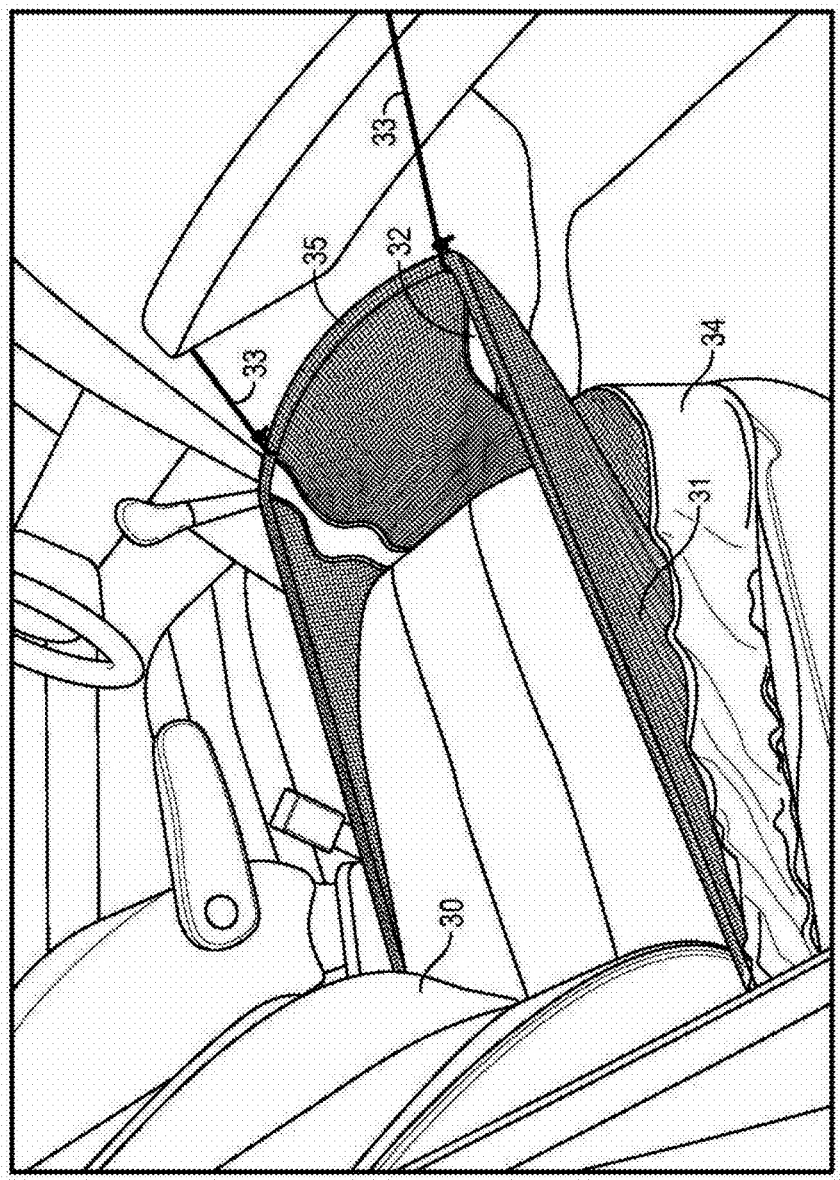
FIG. 4 shows the accessory of FIG. 3 also installed in the vehicle, in the open position.

As shown in FIG. 3, the accessory 31 is in its closed position and wrapped around the front panel and partially the side panels of the seat 30. In this embodiment, the apparatus is secured to the seat by wrapping around the back as shown at 32, but this embodiment may also be secured through other devices such as fasteners to the side panels of the seat, fasteners to the back panel of the seat, and there may be fasteners to the front panel of the seat as well, which would not be visible in this drawing. The embodiment shown is a net-type material, but could be a flexible solid fabric as well. The accessory has two inserts 32 which fold out of the way as shown in FIG. 3 when the accessory is in the closed position. Not visible, also, are extensions of these inserts that will provide a mechanism for securing the accessory to the dashboard when in the open position as shown in FIG. 4. In this embodiment, the accessory is secured in the open position as shown by a cord loop 33 that can be locked into the glove compartment. Other devices for securing the accessory 31 to the dashboard may also be employed; for example, the edge of the accessory shown as 35 may extend all the way to the dashboard and be fastened in place using complementary fasteners on the dashboard and on the accessory.

Also shown is an optional extension from the extendable portion of the accessory 31 which extension 34 embraces the front and side panels of the seat.

Figure 5:
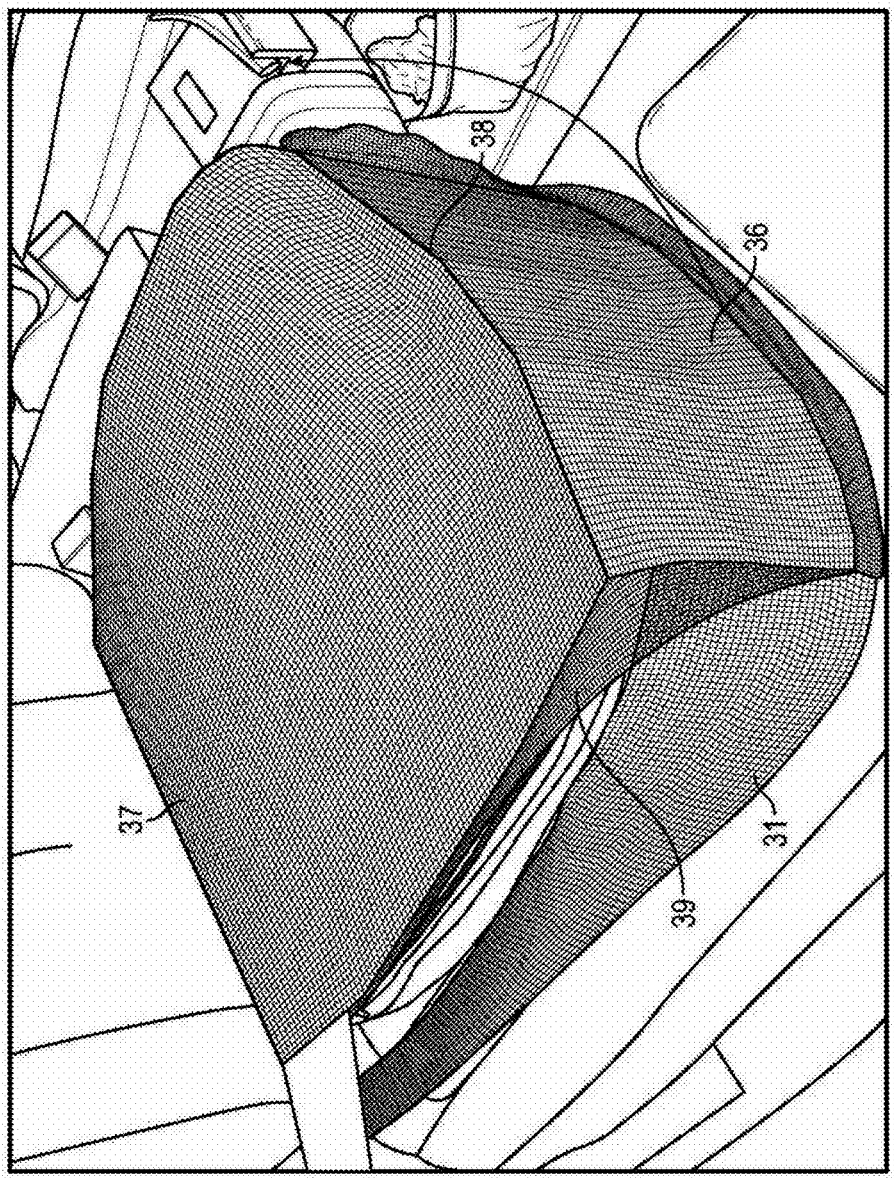
FIG. 5 shows a modified version of the embodiment set forth in FIG. 3 in the closed position.
Figure 6:
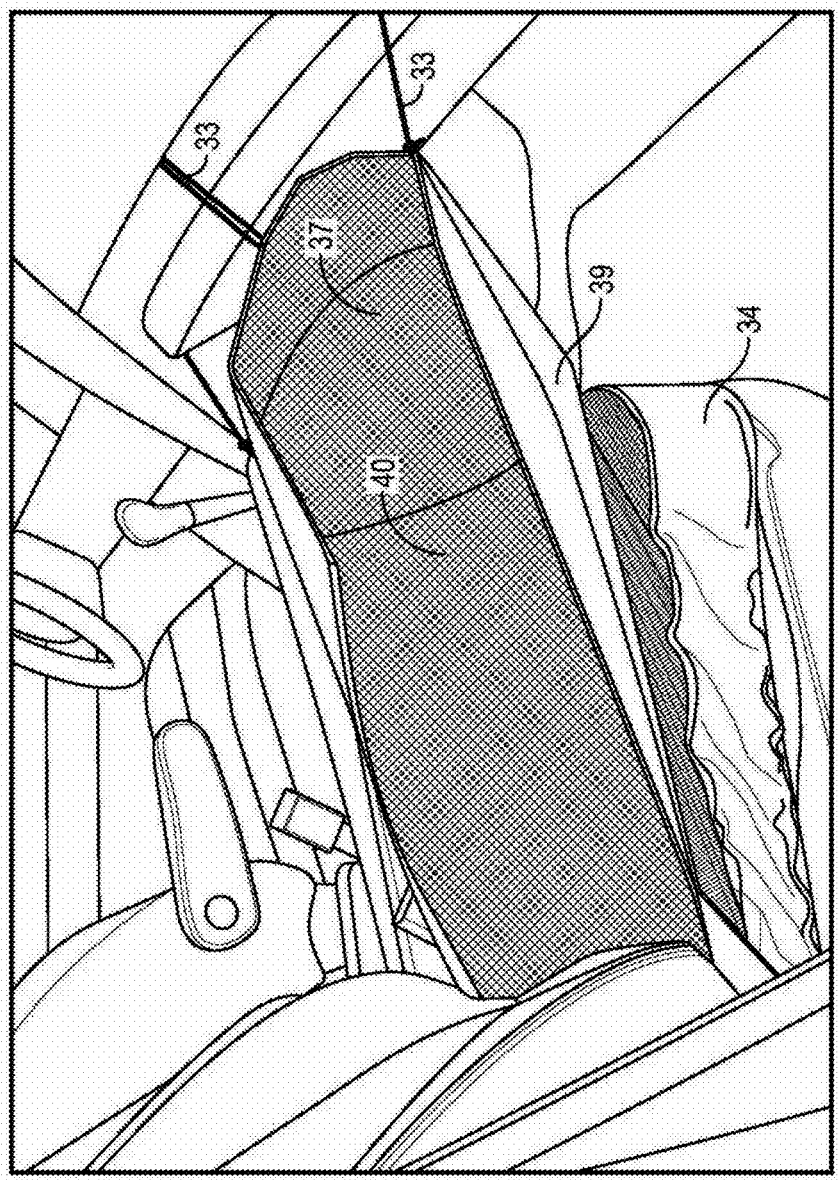
FIG. 6 shows the accessory of FIG. 5 in the open position when installed in the vehicle.

A modification of this embodiment is shown in FIG. 5 in the closed position. In this embodiment, the net shown as 31 in FIG. 3 is coupled to a fabric 36 that hugs the front panel of the seat and is attached to a further fabric extension covering the seat 37 and if desired, secured at the front edge of the seat 38. The seat-covering panel 37 is secured if desired, to the back of the seat through conventional fasteners. An additional flap 39 is included to form a barrier when the accessory is in the open position as shown in FIG. 6. As shown in FIG. 6, the side of the accessory 34 extending along the side panels of the seat corresponds to that shown as 34 in FIG. 4 and in the open position the additional flaps 39 are shown to form a barrier as well. The planar panel 37 is extended onto the back of the seat by additional extensions of the fabric 40. As in FIG. 4, the cords 33 can attach to the dash through a closed glove compartment. In a variation, the planar panel 37 can be modified to contain pleats parallel to the front edge of the seat so that in the closed position the panel can be collapsed into an accordion-like bundle at the front seat edge.

As in the previous embodiments, various devices for fastening to the dashboard and to the seat can be employed.

Still another embodiment is shown in FIG. 7 which is shown only in the open position; the accessory is comprised essentially of a cushion 44 which is of sufficient vertical dimensions to accommodate a retractable panel 45 which when extended can be secured at an angular position to the dashboard. The cushion has a front edge 41, a back edge 42 and side edges 43. The panel, 45, is slidably enclosed in the cushion 41 through an opening at the front end of the cushion. To extend the panel, it needs simply to be pulled from its closed position hidden within the cushion 44. The opening in the front edge 41, in the front vertical portion of the cushion, will permit the panel to be slid in and out of the cushion itself. The opening is provided with ridges or other stops to prevent the panel 45 from being removed entirely from the cushion. The back edge 46 of the panel may be secured to the dashboard in a manner similar to those described above, e.g., complementary fasteners on the panel itself and on the dashboard such as Velcro™ patches or magnetic patches or the configuration of the opening at the front edge of the cushion may be sufficient to provide stability to the open position. The cushion 44 is manufactured from customary materials used in car seats or other upholstery and is secured to the seat itself by any of a variety of devices such as vertical extensions that hug the side panels 16 of the seat itself and may extend around the front panel as well. Shown in FIG. 5 is an optional fastener 47 that aids in the positioning of the cushion. Straps may also extend through the back edge of the cushion and be secured to the back panel of the seat.

The extended panel 45 is conveniently but not necessarily framed to provide additional stability by a rigid frame 48 and any thin, light-weight material may be used for the body of panel 45, such as fabric or screening.

Figure 8A:
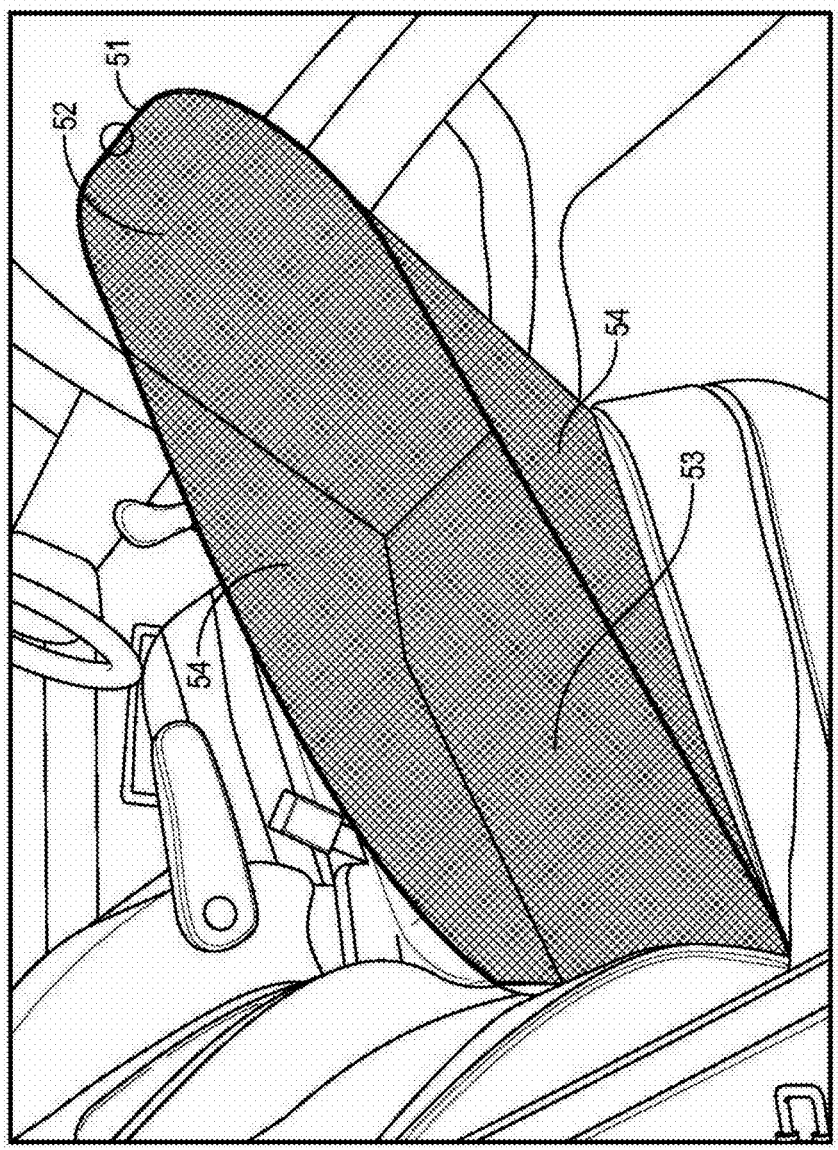
FIGS. 8A and 8B show the open and closed position of still another embodiment of the apparatus of the invention. In this embodiment, the removable accessory has a collapsible frame surrounding a fabric or net interior.
Figure 8B:
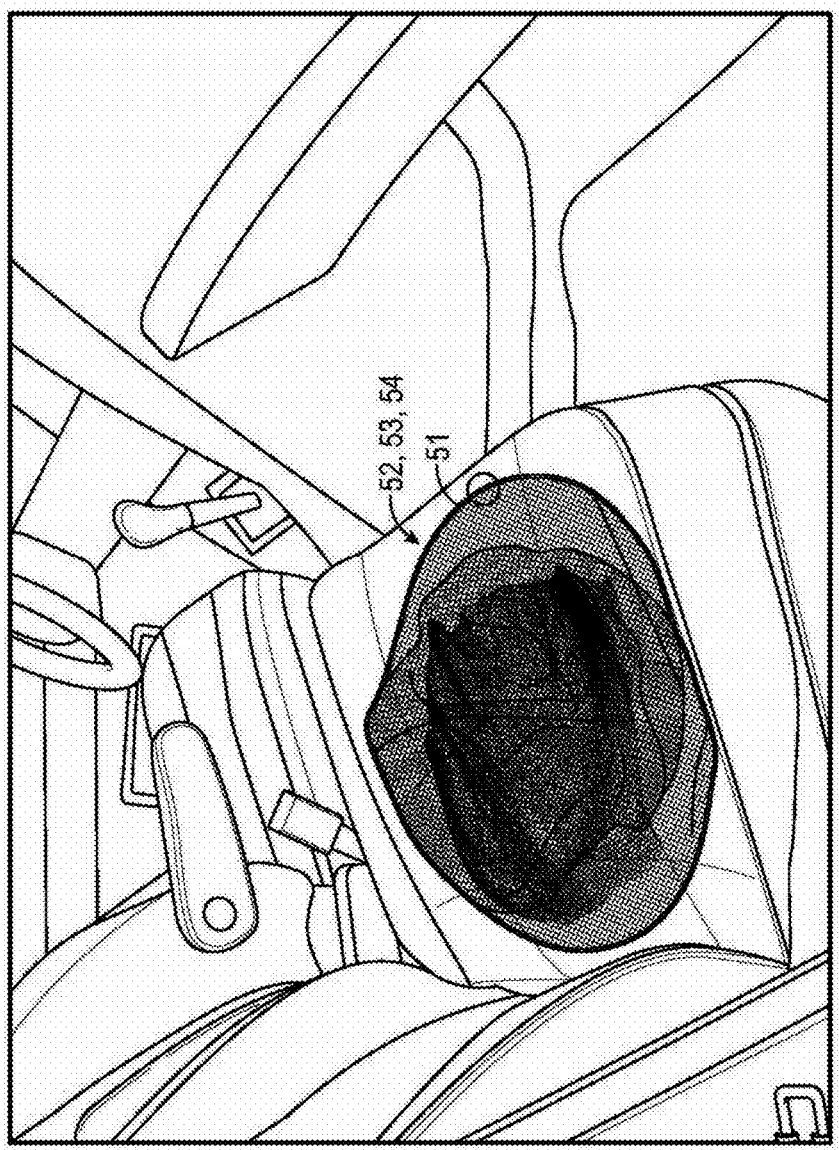

Still another embodiment of the invention is shown in FIGS. 8A and 8B. As shown in FIG. 8A, a flexible, but sturdy frame 51 surrounds at least on three sides a fabric or mesh interior. The interior is designed to provide the barrier 52 at an angle to the dashboard where it is secured by any of the means described herein such as complementary fasteners, suction cups, magnetic association, cords through the glove compartment, and the like. The interior also has a portion 53 that is parallel to or flush with the seat portion of the bucket seat extending from the back edge of the seat and secured by any convenient design, including simply tucking the interior into the crevice between the seat and the seat back. In this embodiment, side portions 54 provide further security.

In FIG. 8B, one option for the closed position is shown where the collapsible frame is compressed into a spiral in a manner similar to sun-screen components. As shown, the interior portions 52-54 are simply compressed within the frame 51. This embodiment is, of course, readily removable and takes up very little space when in the closed position.

All of the embodiments of the invention may be permanently or removably installed, but many embodiments provide for passenger comfort, and thus removable installation is not necessary or even desirable. The embodiment having only a single planar panel may also be permanently installed if the attachment of the planar member to the passenger seat can accommodate a passenger, or if it is seen that no passengers will be taken. In other embodiments it is optional and less convenient to provide a removable installation. For example, in the embodiment where netting is provided around the front panel of the passenger seat, and then extended to the dashboard, removable installation is neither desirable nor necessary.

The invention claimed is:

1. An accessory for a vehicle having a passenger side bucket seat, said bucket seat having a back, a substantially horizontal seat portion and vertical front, side and back panels extending downward therefrom, said accessory comprising an apparatus that when installed and in an open position provides an essentially planar barrier at an angle between the front panel of the passenger seat and the dashboard of the vehicle, and when in said open position and installed is secured by a securing element to the dashboard, which accessory comprises:
a first member having a horizontal flexible planar section designed to be set on said seat so as to place said first planar section essentially flush with the substantially horizontal seat portion said first planar section having front, back and side edges, said front edge facing the dashboard and said back edge at the back of the horizontal seat portion when set on said seat,
a second flexible planar member having front, back and side edges and coupled at its front edge to the front edge of the first member which when in the open position provides said planar barrier; and
third flexible planar members vertical to and disposed on the side edges of said first and second panels which third members form barriers extending from the back edge of the first panel to the dashboard,
wherein said first, second and third planar members are of fabric or mesh and surrounded by a collapsible frame enclosing said fabric or mesh
wherein the accessory is placed in a closed position by compressing the collapsible frame into a spiral.

2. The accessory of claim 1 wherein said securing element comprises
a device coupled to the dashboard to associate with a complementary device on said second member, or
a cord attached to the second member for attachment to the dashboard or glove compartment, or
a suction cup.

* * * * *